United States Patent [19]

Knapp et al.

[11] Patent Number: 4,753,205
[45] Date of Patent: Jun. 28, 1988

[54] FUEL INJECTION APPARATUS

[75] Inventors: Heinrich Knapp, Leonberg; Peter Romann, Stuttgart; Rudolf Sauer, Benningen, all of Fed. Rep. of Germany

[73] Assignee: Robert Bosch GmbH, Stuttgart, Fed. Rep. of Germany

[21] Appl. No.: 285,893

[22] Filed: Jul. 23, 1981

[30] Foreign Application Priority Data

Aug. 26, 1980 [DE] Fed. Rep. of Germany ....... 3032067

[51] Int. Cl.$^4$ ............................................. F02M 39/00
[52] U.S. Cl. ..................................... 123/472; 123/494
[58] Field of Search ............... 123/494, 470, 585, 590, 123/531, 445, 472, 469, 471

[56] References Cited

U.S. PATENT DOCUMENTS

| 4,186,708 | 2/1980 | Bowler | 123/445 |
| 4,237,836 | 12/1980 | Tanasawa et al. | 123/472 |
| 4,264,961 | 4/1981 | Nishimura | 123/494 |

*Primary Examiner*—Carl Stuart Miller
*Attorney, Agent, or Firm*—Edwin E. Greigg

[57] ABSTRACT

A fuel injection apparatus for separately ignited internal combustion gas engines is proposed. The fuel injection apparatus comprises an air intake stack in which an injection valve is arranged upstream of a throttle valve. A ring slot developed approximately Venturi-shaped is formed between the casing of the injection valve and the cylindrical inner wall of the air intake stack. An air bypass line discharges into the narrowest cross-section of the ring slot developed approximately Venturi-shaped which begins upstream of the approximately Venturi-shaped ring slot. An air measuring organ with at least one temperature dependent resistance for measuring the air mass flowing through is arranged in the air bypass line. Downstream of the temperature dependent resistance the air bypass line has a section developed in the shape of a funnel into which a cone shaped brake body concentrically protrudes which is supported axially displaceable and through which not only an optimal output signal of the air measuring organ in dependence on the sucked in air mass can be adjusted, but a balancing of the characteristic curve of the air measuring organ can take place as well. The proposed fuel injection apparatus allows a compact construction which permits the accommodation in the engine room of the internal combustion engine of motor vehicles even with cramped conditions as well as a reliable method of operation.

12 Claims, 2 Drawing Sheets ial combustion engines shown in FIG. 1, a bridge cir-
FUEL INJECTION APPARATUS

CROSS-REFERENCE TO RELATED INFORMATION

There are no patents or printed publications having a bearing on the patentability of the present invention, but of interest are the following:

| | U.S. Patent Applications |
|---|---|
| Knapp, Heinrich; Romann, Peter; and Sauer, Rudolf | U.S. Pat. No. 4,416,241 |
| Knapp, Heinrich et al | U.S. Pat. No. 4,299,124 |
| Peter, Cornelius | U.S. Pat. No. 4,196,622 |

BRIEF SUMMARY OF THE INVENTION

The invention is based upon and relates to an improved fuel injection apparatus for separately ignited internal combustion gas engines having an annular or ring slot formed to approximate a Venturi-shaped section including therein an injection valve.

BACKGROUND OF THE INVENTION

A fuel injection apparatus is known in which an air intake stack is provided with a funnel shaped section upstream of a throttle valve to which an air bypass is disposed, which discharges at the narrowest part of the funnel shaped section and via which an air quantity flows, which is in a certain relation to the air quantity flowing through the air intake stack and which is measured by a temperature dependent resistance. Thereby the injection takes place downstream of the throttle valve. Such a construction does not just put limitations on a compact construction of the fuel injection apparatus but also necessitates a relatively large throttle diameter of the air intake stack.

OBJECTS AND SUMMARY OF THE INVENTION

The fuel injection apparatus is provided having the advantage of a very compact and short construction which permits, even with very small space conditions, an installation into the engine room of the internal combustion engine of motor vehicles, with a small necessary cross-section for the throttle member, whereby advantages result in the response characteristics and cylindrical execution of the inner wall of the air intake stack as well as a reliable method of operation and a very good preparation of the injected fuel.

As a result of the characteristics disclosed in species of the invention, structural embodiments and improvements as well as advantageous modifications of the fuel injection apparatus disclosed can be obtained.

A fuel injection apparatus executed according to the characteristics of the invention provides an optimal output signal of the air meter and/or to balance the characteristic curve of the air meter.

It is also advantageous to support the temperature dependent resistance in an annular body partially embodying the air bypass line in an insulating manner.

It is advantageous, as well, to develop the air intake stack according to the invention in 6 or 8 cylinder internal combustion engines, whereby the injection takes place through one injection valve for three and/or four cylinders of the internal combustion engine at any given time, but only one mutual air measuring organ in a mutual air bypass is required.

The invention will be better understood and further objects and advantages thereof will become more apparent from the ensuing detailed description of a preferred mebodiment taken in conjunction with the drawings.

DESCRIPTION OF THE PREFERRED EMBODIMENT

Figure 1:
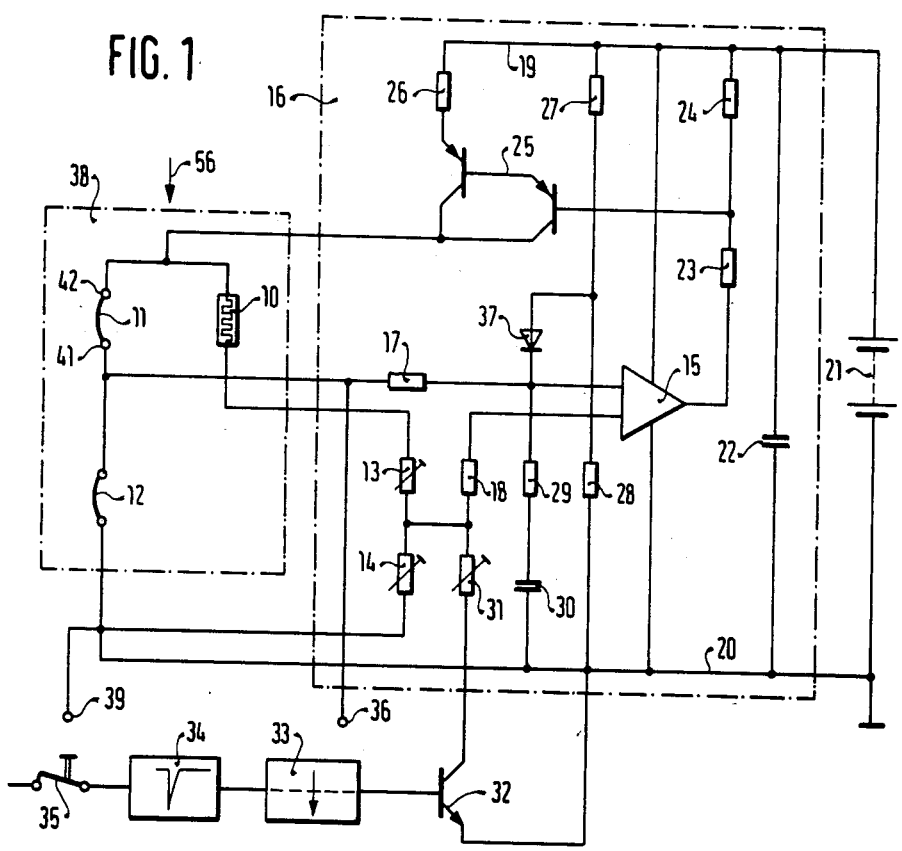
FIG. 1 shows a circuit diagram of an apparatus for measuring the mass of a flowing medium, especially for measuring the air intake mass of internal combustion engines.

In the apparatus for measuring the mass of a flowing medium, especially for measuring the intake air of internal combustion engines shown in FIG. 1, a bridge circuit is provided having a temperature dependent resistance 10, a temperature dependent resistance 11, a resistance 12, and resistances 13 and 14. A variable gain amplifier 15 of a control devide 16 is connected across the bridge diagonal. Thereby, the inverting imput of the variable gain amplifier 15 is connected to the coupling location of the resistances 11 and 12 via an input resistance 17, while the non-inverting imput of the variable gain amplifier 15 is connected to the coupling location of the resistances 13 and 14 via an input resistance 18. The variable gain amplifier 15 is connected with a direct-current supply 21 via two supply lines 19 and 20. A smoothing condensor 22 is joined in parallel to this direct-current supply 21. The output of the variable gain amplifier 15 is connected with the series connection of two resistances 23 and 24, whereby the resistance 24 is connected to the mutual supply line 19. These two resistances 23 and 24 form a voltage divider for a Darlington amplifier or circuit 25 which, together with a resistance 26 form a voltage controlled source of current for the current supply of the bridge circuit of resistances 10, 11, 12, 13, and 14. A voltage divider of resistances 27 and 28 is interposed between the mutual supply lines 19 and 20. The anode of a diode 37 is connected to the coupling location of the resistances 27 and 28, the cathode of which is joined to the inverting imput of the variable gain amplifier 15. The series connection of a resistance 29 and a condensator 30 is interposed between the inverting imput of the variable gain amplifier 15 and the mutual supply line 20, whereby this resistance-condensator combination serves for the frequency tuning of the automatic control system for the time behavior of the temperature dependent resistances. A resistance 31 is connected to the coupling location of the resistances 13 and 14. This resistance 31 can be connected to the mutual supply line 20 via the switching path of a switching transistor 32. The basis of the switching transistor 32 is connected with the output of a monostable trigger phase circuit or multivibrator 33 which can be activated, via a differentiating link, by an ignition switch indicated at 35 for the ignition system of the internal combustion engine or by an impulse supplied by a different means.

The mode of operation of the described apparatus is the following. A certain current flows over the temperature dependent resistance 11 of the bridge circuit and heats the resistance up to its normal temperature of operation. In another bridge branch the temperature dependent resistance 10 takes on a resistance value that characterizes the temperature of the flowing medium, for example, that of the intaken air of the internal combustion engine. Thereby it is achieved that the temperature of the intake air of the internal combustion engine is always used as a reference signal for the filament-current regulation of the device to measure the air mass. The temperature dependent resistance 11 is cooled off more or less according to the mass of intake air flowing by. This causes a detuning of the bridge circuit. This detuning of the bridge circuit is balanced in that the variable gain amplifier supplies a larger supply current for the bridge circuit via the voltage controlled source of resistances 23, 24, 25, and 26 so that the temperature of the temperature dependent resistance 11, and therewith its resistance value, is kept at a value at least approaching constant. The current flowing through the bridge circuit is a measure for the air mass flowing past the temperature dependent resistance 11 in the direction of the arrow 56. A related electric signal can be received between a terminal 36 and a terminal 39.

The voltage divider 27, 28 with the diode 37 serves to ease the starting of the control device. A voltage of approximately 0.5 volts is enforced at the inverting input of the variable gain amplifier 15 when turning on the control device which permits a safe starting of the control device. In normal operation condition, in contrast, the current at the inverting input of the variable gain amplifier 15 will be considerably higher than this starting current, so that the diode 37 is blocked and thus the control processes can not be influenced via the voltage divider 27, 28.

So that the temperature dependent resistance 11 embodied as a heat wire or a heat band, as described in the following, is cleared of deposits on its surface from time to time, a large current is supposed to flow through this temperature dependent resistance 11 after a certain measuring cycle. Thereby a certain operation period of the internal combustion engine, for example, can be selected as a measuring cycle. Thus the annealing process can also be initiated with each turning off of the ignition system of the internal combustion engine. This takes place with the turning off of the ignition switch 35. The corresponding signal is differentiated and controls the monostable trigger phase circuit or multivibrator 33 in its instable switching condition. During this instable switching condition of the monostable switching phase circuit or multivibrator 33 the switching transistor 32 becomes conductive and connects in parallel the resistance 31 to the resistance 14 of the bridge circuit. This strongly detunes the bridge circuit consisting of the resistances 10, 11, 12, 13, and 14 and this in the sense that the variable gain amplifier 15 supplies a higher current for the bridge circuit to compensate this detunement. This higher current heats up the temperature dependent resistance 11 for the duration of the instable switching condition of the monostable trigger phase to a temperature which is higher than the normal operation temperature, so that the deposits on the surface of the temperature dependent resistance burn up.

It has proven to be especially appropriate if the material of the temperature dependent resistance 11 consists of structure stabilized platinum, as this material is especially well suited to be heated to a high temperature. This is especially important for the annealing process.

The reference resistance 12 is appropriately disposed in the flow cross-section implied by a dash-dotted line 38, as well, for example in the intake pipe or a bypass to the intake pipe of the internal combustion engine, as the heat due to energy loss of the reference resistance 12 can then be drawn off by the air flowing in the arrow direction 56. The resistances 13 and 14 are, appropriately, executed as adjustable resistances so that the temperature behaviour of the automatic control system can be adjusted.

Figure 2:
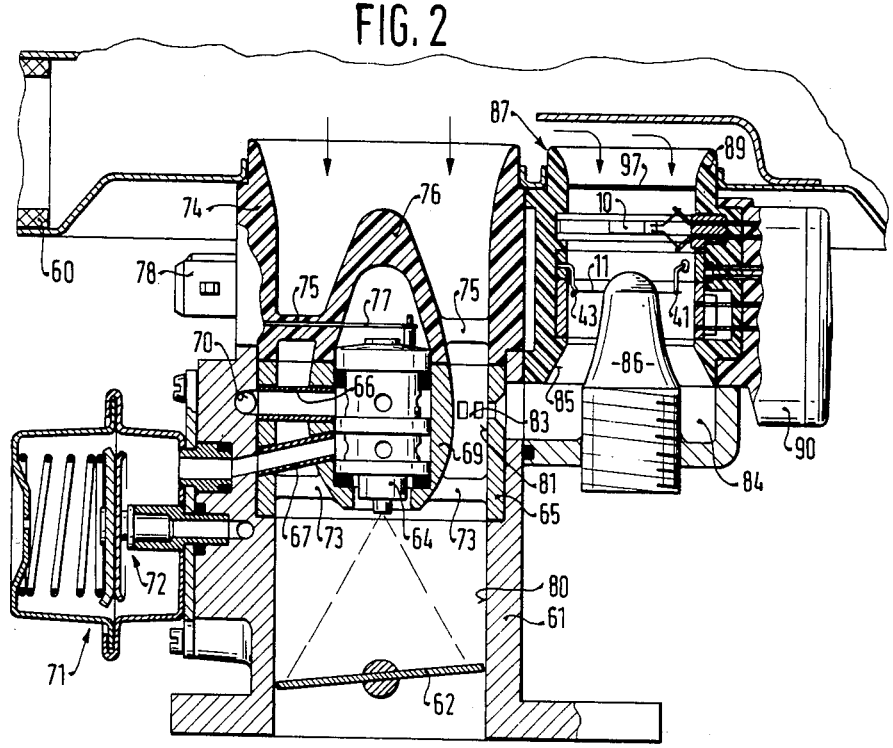
FIG. 2 shows a longitudinal cross-section of a fuel injection apparatus according to the invention.
Figure 3:
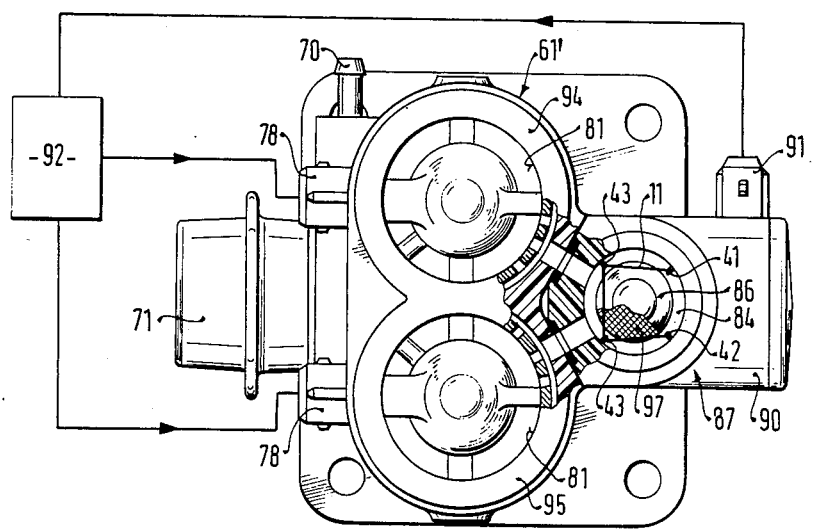
FIG. 3 shows a topview onto a fuel injection apparatus according to the invention with an air intake stack divided into two partial intake stacks.

The apparatus for measuring the mass of a flowing medium according to FIG. 1 finds utilization in a fuel injection apparatus shown, for example, in FIGS. 2 and 3. In the fuel injection apparatus shown in FIG. 2 the combustion air sucked in by the internal combustion engine flows through a partially shown air filter 60 into an air intake stack 61 in the direction of the arrow. A throttle member embodied as a throttle valve 62 is disposed in this air intake stack 61, whereby the flow channel embodied by the air intake stack 61 is more or less opened for the intake air. Upstream of the throttle valve 62 an electromagnetic injection valve 64 is disposed concentrically to the air intake stack 61 in such a manner, that the ejected fuel reaches the opening slot shaped between the throttle valve 62 and air intake slot conically embodied. A supporting ring 65 is concentrically inserted into the air intake stack 61 upstream of the throttle valve 62. A small fuel supply line 66 and a small fuel discharge line 67 are tightly inserted into the supporting ring 65 essentially progressing in a radial direction. The other ends of the small fuel supply line 66 and the small fuel discharge line 67 are tightly fastened into a casing 69 which surrounds the injection valve 64 and leads concentrically into the air intake stack 61 upstream of the throttle valve 62. The fuel flowing in from a fuel pump (not shown) via a fuel channel 70 in the air intake stack 61 reaches the electromagnetic injection valve 64 via the small fuel supply line 66. A small portion of the fuel is ejected through this electromagnetic injection valve 64. The remaining portion of the fuel flows through the fuel injection valve 64 to cool and to remove steam bubbles that eventually form and flow, via the small fuel discharge line 67, into a pressure control valve 71 embodied, for example, as a membrane pressure regulator. The fuel pressure asserting on the injection valve 64 is regulated by this pressure control valve 71 and fuel can flow back to the suction side of the fuel pump or to the fuel container via its opened valve seat 72. The pressure control valve 71 is appropriately disposed on the air intake stack 61 in the area of the injection valve 64 so as to achieve as compact an embodiment as possible.

Radially directed cross pieces 73 provided streamlined as possible are, appropriately, provided between the the supporting ring 65 and the casing 69 as mounting supports. A partial section 74 of the air intake stack 61 directed towards the air filter 60 can advantageously be made of synthetic material and displays radial crosspieces 75 which support a section 76 of the casing of the injection valve 64 concentrically in the air intake stack 61 upstream of the injection valve 64 and via which the electric connection 77 of the injection valve 64 is guided to an electric plug junction 78 on the outer circumference of the partial section 74.

The inner wall 80 of the air intake stack 61 and the partial section 74 is embodied cylindrically according to the invention, and the casing 69, 76 of the electromagnetic injection valve 64 is oval shaped in the flow direction in such a manner, that a ring slot 81 developed approximately Venturi-shaped is formed between the casing 69, 76 and the inner wall 80 of the air intake stack and the partial section 74. This has the advantage that the air intake stack 61 and the partial section 74 can be executed with a constant small inner diameter, so that advantages result in the response characteristics through the installation of a throttle valve 62 with a thereby necessary small diameter.

An air bypass line 84 discharges into the narrowest cross-section 83 of the ring slot 81 developed approximately Venturi-shaped of the air intake stack 61. This air bypass line 84 begins upstream of the Venturi-shaped ring slot 81, for example at the air intake stack. An air mass flows through the air bypass line 84 which is in a certain relation to the air mass flowing through the Venturi-shaped ring slot 81. The air bypass line 84 has a funnel shaped section 85 into which a conically shaped brake body 86 protrudes concentrically. The conically shaped brake body 86 can advantageously be disposed in the air bypass line 84 in such a manner that it can be axially displaced; for example the conically shaped brake body 86 can be screwed into the wall of the bypass line. Preferably, the funnel shaped section 85 and the brake body 86 are arranged downstream of an air measuring means 87 in the air bypass line 84. The air measuring means 87, the construction and function of which has already been described in reference to FIG. 1, is advantageously provided in a ring body 89 which partially forms the air bypass line 84 and in which the temperature dependent resistance 11 is insulatedly guided via brackets in such a manner, that it forms as good as possible a median value over the flow. Hooks can serve as brackets, whereby the temperature dependent resistance 11 embodied as a heat band or heat wire is guided to an end bracket 42 starting at a beginning bracket 41 via an intermediate bracket 43 (see FIG. 3) in a known way. Arranged in the bypass air flow as well, is the compensation resistance 10 and it is maintained by the ring body 89. The ring body 89 has a block shaped section 90 which is arranged laterally to the air flow outside of the air bypass line. The blocked shaped section 90 contains the control circuit embodied as a hybrid switching unit and an electric plug junction 91. The measured signal of the intake air mass determined by the temperature dependent resistance 11 can be received at the electric plug junction 91 and can be fed into an electric control device 92. Further data of the operating condition of the internal combustion engine as, for example, temperature or exhaust gases composition are led to the electronic control device 92 and the injection valve 64 can be controlled by it via the electric plug junction 78 (see FIG. 3). The output characteristic of the described air measuring means 87 is defined, appart from the interpretation of the ring slot 81 developed approximately Venturi-shaped, by the flow speed of the air in the air bypass line 84 at the temperature dependent resistance 11. The flow speed can not only be defined by the conically shaped brake body 86 in such a manner that an optimal output signal of the air measuring means 87 in dependence of the air mass flowing over the ring slot 81 results, but also by displacing the brake body 86 a balancing of the characteristic curve of the air measuring means 87 can take place in an easy manner.

In 6 and 8 cylinder internal combustion engines it is found necessary, when using a central injection, to supply three and/or four cylinders with an injection valve 64 with fuel at the same time. Therefore, with reference to the preferred embodiment according to FIG. 3, the air intake stack 61' displays two partial intake stacks 94, 95 each arranged parallel to each other and with one throttle valve 62 for each intake stack. A ring slot 81 developed or formed approximately Venturi-shaped as already described with references to FIG. 2 is located upstream of each throttle valve 62 and is positioned into the narrowest diameter 83 of which the mutual air bypass line 84 discharges beginning upstream of the ring slot 81. Therefore only one air bypass line 84 with one air measuring organ 87 is necessary for measuring the air being sucked in via the two partial intake stacks 94, 95. A flow porous protection element 97 constructed in the shape of a screen, for example, a wire grid, is provided upstream of the temperature dependent resistance 11 lateral to the direction of the air flow in the air bypass line to protect from eventual touching or heavy soiling. As has already been described with reference to the preferred embodiment according to FIG. 2, and injection valve 64 provided with a casing 69, 76 is arranged in each individual partial intake stack 94, 95. This casing 69, 76, together with the cylindrical inner wall of each partial intake stack, forms a ring slot 81 developed approximately Venturi-shaped.

The described injection apparatuses represent reliably operating and simply and compactly constructed fuel injection apparatuses which, due to their low construction height, find space in the engine room of the internal combustion engine of a motor vehicle even with very narrow space conditions.

Simultaneously, the possibility of obtaining an optimal output signal of the air measuring organ through very simple means and of balancing the characteristic curve of the air measuring organ results.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A fuel injection apparatus for separately ignited internal combustion gas engines comprising
   an air intake stack having a section developed approximately Venturi-shaped upstream of a throttle member,
   an air bypass line connected into the narrowest cross-section of said Venturi-shaped section, said bypass line beginning upstream of the approximately Venturi-shaped section and discharging an air mass flowing through said air bypass line which is in a certain relation to the air mass flowing through the approximately Venturi-shaped section,
   an air measuring means containing at least one temperature dependent resistance the temperature and/or resistance of which is controlled in dependence of the flowing air mass and the adjusting magnitude of which is a measure for the flowing air mass being arranged in said bypass line,
   the intake stack having a cylindrical inner wall,
   an injection valve upstream of the throttle valve concentrically disposed in the air intake stack,
   said injection valve being provided with a casing shaped in such a manner that a section with a ring slot developed approximately Venturi-shaped is formed between the casing and the inner wall of the air intake stack, and said air bypass line having a section developed in a funnel shape into which a conically shaped brake body protrudes concentrically.

2. A fuel injection apparatus for separately ignited internal combustion gas engines comprising an air intake stack having a section developed approximately Venturi-shaped upstream of a throttle member, an air bypass line connected into the narrowest cross-section of said Venturi-shaped section, said bypass line beginning upstream of the approximately Venturi-shaped section and discharging an air mass flowing through said air bypass line which is in a certain relation to the air mass flowing through the approximately Venturi-shaped section, an air measuring means containing at least one temperature dependent resistance the temperature and/or resistance of which is controlled is dependence of the flowing air mass and the adjusting magnitude of which is a measure for the flowing air mass being arranged in said air bypass line, the intake stack having a cylindrical inner wall, an injection valve upstream of the throttle valve concentrically disposed in the air intake stack, said injection valve being provided with a casing shaped in such a manner that a section with a ring slot developed approximately Venturi-shaped is formed between the casing and the inner wall of the air intake stack.

3. A fuel injection apparatus according to claim 2, characterized in that at least one fixed fuel line is connected to the casing of the injection valve, said fuel line being fastened on the other side in a supporting ring inserted into the air intake stack.

4. A fuel injection apparatus according to claim 2, characterized in that a pressure control valve is provided on the air intake stack in the area of the injection valve, said pressure control valve regulating the fuel pressure of the injection valve.

5. A fuel injection apparatus according to claim 1, characterized in that the conically shaped brake body is axially displaced.

6. A fuel injection apparatus according to claim 5, characterized in that the section developed in a funnel shape and the conically shaped brake body are arranged downstream of the temperature dependent resistance in the air bypass line.

7. A fuel injection apparatus according to claim 6, characterized in that the temperature dependent resistance is insulatedly supported in a ring body partially forming the air bypass line.

8. A fuel injection apparatus according to claim 7, characterized in that the ring body contains elements of a bridge conduit and of an electronic control circuit.

9. A fuel injection apparatus according to claim 8, characterized in that the ring body has a block shaped section arranged laterally to the air flow outside of the air bypass line, said block shaped section containing the electronic control circuit and an electric plug junction.

10. A fuel injection apparatus according to claim 9, characterized in that upstream of the temperature dependent resistance a flow porous protection element executed in the shape of a screen is disposed laterally to the air flow direction in the air bypass line.

11. A fuel injection apparatus according to claim 1 or 9, characterized in that the air intake stack displays two partial intake stacks disposed parallel to each other with one throttle valve each, of which each has a section developed approximately Venturi-shaped upstream of each throttle valve and into the narrowest diameter of which the mutual air bypass line discharges, which begins upstream of the approximately Venturi-shaped section, an air mass flowing through said air bypass line, said air mass being in a certain relation to the air mass flowing through the approximately Venturi-shaped section and in which at least one temperature dependent resistance of the air measuring means is arranged.

12. A fuel injection apparatus according to claim 11, characterized in that each partial intake stack has a cylindrical inner wall and an injection valve is arranged concentrically in each partial intake stack upstream of each throttle valve and said injection valve is provided with a casing shaped in such a manner, that a section with a ring slot developed approximately Venturi-shaped is formed between the casing and the inner wall of each partial intake stack.

* * * * *